United States Patent
Larkins

(10) Patent No.: US 10,640,008 B2
(45) Date of Patent: May 5, 2020

(54) SYSTEMS AND METHODS FOR VEHICLE SEAT OCCUPANCY DETECTION

(71) Applicant: Ford Global Technologies, LLC, Dearborn, MI (US)

(72) Inventor: Jon Larkins, Temperance, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/723,946

(22) Filed: Oct. 3, 2017

(65) Prior Publication Data

US 2019/0100115 A1 Apr. 4, 2019

(51) Int. Cl.
*B60N 2/00* (2006.01)
*B60R 21/015* (2006.01)
*B60R 21/01* (2006.01)
*B60R 21/00* (2006.01)

(52) U.S. Cl.
CPC .......... *B60N 2/002* (2013.01); *B60R 21/0152* (2014.10); *B60R 21/01512* (2014.10); *B60R 21/01542* (2014.10); *B60R 21/01554* (2014.10); *B60R 2021/0032* (2013.01); *B60R 2021/0102* (2013.01)

(58) Field of Classification Search
CPC ................ B60N 2/002; B60R 21/0152; B60R 21/01542; B60R 21/01554; B60R 2021/0032; B60R 2021/0102
See application file for complete search history.

(56) References Cited

U.S. PATENT DOCUMENTS

| | | | |
|---|---|---|---|
| 7,019,641 B1* | 3/2006 | Lakshmanan | B60N 2/002 340/438 |
| 8,258,932 B2 | 9/2012 | Wahlstrom | |
| 8,558,713 B2 | 10/2013 | Griffin et al. | |
| 2012/0018989 A1* | 1/2012 | Breed | B60R 21/01516 280/735 |
| 2014/0316660 A1* | 10/2014 | Le | B60N 2/0244 701/49 |
| 2016/0311388 A1 | 10/2016 | Diewald | |
| 2018/0079322 A1* | 3/2018 | Tanriover | B60N 2/002 |
| 2018/0178690 A1* | 6/2018 | Castillo | B60N 2/002 |

FOREIGN PATENT DOCUMENTS

| | | |
|---|---|---|
| CN | 102602361 A | 7/2012 |
| JP | 2016078530 A | 5/2016 |
| KR | 20130021980 A | 3/2013 |
| WO | WO 201638148 A1 | 3/2016 |

* cited by examiner

*Primary Examiner* — Darlene P Condra
(74) *Attorney, Agent, or Firm* — Frank A. MacKenzie; Bejin Bieneman PLC

(57) ABSTRACT

Method and apparatus are disclosed for determining vehicle seat occupancy. An example vehicle includes a vehicle seat, an accelerometer coupled to the vehicle seat, and a restraint control module. The restraint control module is configured to determine a minute of arc measurement for the vehicle seat based on data received from the accelerometer, determine that the vehicle seat is occupied based on the minute of arc measurement, and provide an alert.

20 Claims, 5 Drawing Sheets

SYSTEMS AND METHODS FOR VEHICLE SEAT OCCUPANCY DETECTION

TECHNICAL FIELD

The present disclosure generally relates to vehicle seats and vehicle electronic systems and, more specifically, systems and method for vehicle seat occupancy detection.

BACKGROUND

Many modern vehicles include safety systems that are activated only when a passenger is present in the passenger seat (or in the rear seats). Further, many vehicles come with a warning system that provides an alert when the passenger side seat belt is not buckled if a person is present in the passenger seat.

These systems may rely on one or more sensors to provide information used to determine whether a seat is occupied. Traditionally, this may be done through the use of one or more pressure sensors in a bottom portion of the vehicle seats, which provide an indication of when a weight is present in the seat above a threshold. The vehicle can then display an alert or emit an audible signal to indicate that the seat is occupied and the seatbelt is unbuckled.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown describing systems, apparatuses, and methods for detecting the presence of a person in a vehicle seat. An example disclosed vehicle includes a vehicle seat, an accelerometer coupled to the vehicle seat, and a restraint control module. The restraint control module is configured to determine a minute of arc measurement for the vehicle seat based on data received from the accelerometer. The restraint control module is also configured to determine that the vehicle seat is occupied based on the minute of arc measurement, and to provide an alert to one or more vehicle occupants.

An example disclosed method for detecting vehicle seat occupancy includes determining, by a vehicle restraint control module, a minute of arc measurement based on data received from an accelerometer coupled to a vehicle seat. The method also includes determining, by the vehicle restraint control module, that the vehicle seat is occupied based on the minute of arc measurement. And the method further includes providing an alert indicating the vehicle seat is occupied.

A third example may include means for detecting vehicle seat occupancy including means for determining a minute of arc measurement based on data received from an accelerometer coupled to a vehicle seat. The third example also includes means for determining that the vehicle seat is occupied based on the minute of arc measurement. And the third example further includes means for providing an alert indicating the vehicle seat is occupied.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
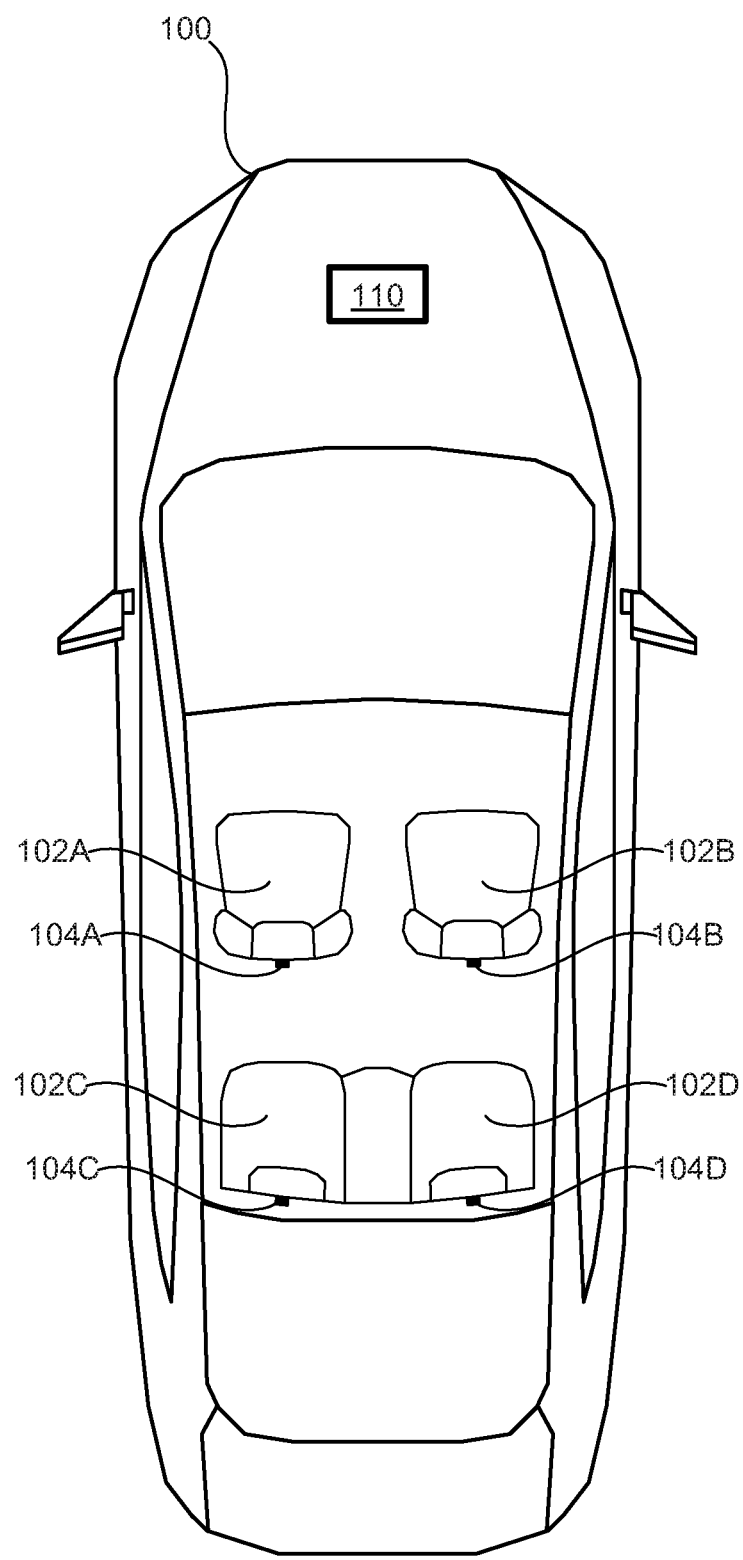
FIG. 1 illustrates an example vehicle according to embodiments of the present disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

As noted above, vehicles may include one or more safety measures that can be activated when a passenger is present in a passenger seat. For instance, one or more airbags may be put in to an active mode when a passenger is present, but made inactive when there is no one present. Further, it may be beneficial to provide an alert or warning when a seatbelt is unbuckled while a passenger is present in the passenger seat.

Some vehicle may make use of a pressure sensor in the bottom of the seat that can register when a weight is present on the seat. These systems may require placing a sensor into the seat, which can interfere with seat heating systems, take up additional space. Further, traditional methods of determining seat occupancy may not be able to distinguish between a person and a box or other inanimate object. As such, a warning light or sound may be inadvertently activated even where there is no person present.

With these issues in mind, example embodiments described herein may include making use of one or more accelerometers placed at various locations on a vehicle seat. The accelerometers may measure the vibrations, shake, and other movements of the various sections of the seat on which the accelerometers are placed. This data may then be used to determine a minute of arc (MOA) measurement for the seat. When a passenger seat is unoccupied, the seat back may shake back and forth with a particular signature, giving rise to a corresponding minute of arc measurement. Similarly, an occupied seat may have a different signature and a different corresponding minute of arc measurement. These differences can be exploited to provide an indication of whether the seat is occupied, and whether a person occupies the seat or whether an inanimate object occupies the seat.

FIG. 1 illustrates an example vehicle 100 according to some embodiments. Vehicle 100 may be a standard gasoline powered vehicle, a hybrid vehicle, an electric vehicle, a fuel cell vehicle, or any other mobility implement type of vehicle. Vehicle 100 may be non-autonomous, semi-autonomous, or autonomous. Vehicle 100 may include parts related to mobility, such as a powertrain with an engine, a transmission, a suspension, a driveshaft, and/or wheels, etc. In the illustrated example, vehicle 100 may include one or more electronic components (described below with respect to FIG. 2).

Figure 3:
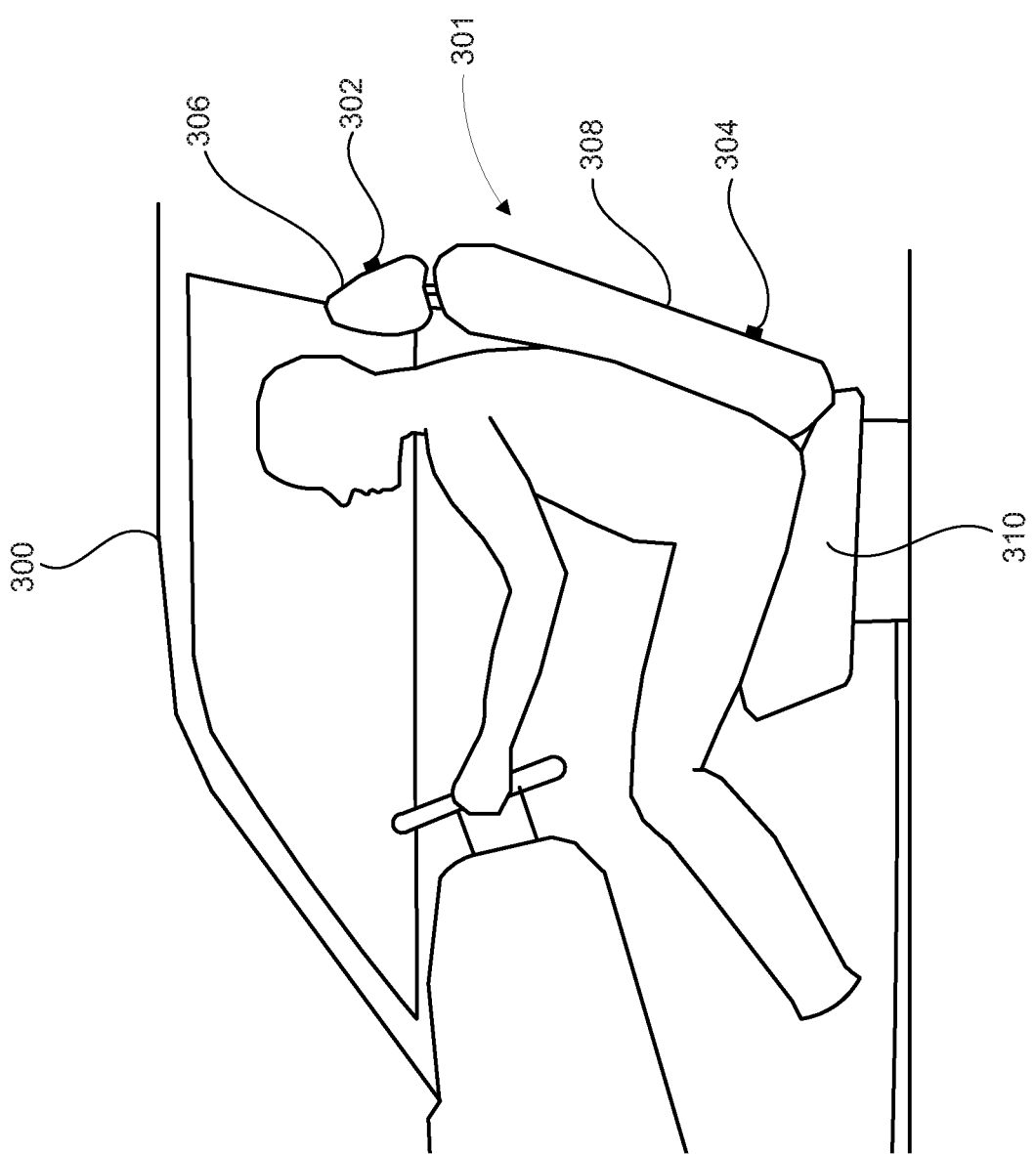
FIG. 3 illustrates a side perspective view of an example vehicle seat according to embodiments of the present disclosure.
Figure 4:
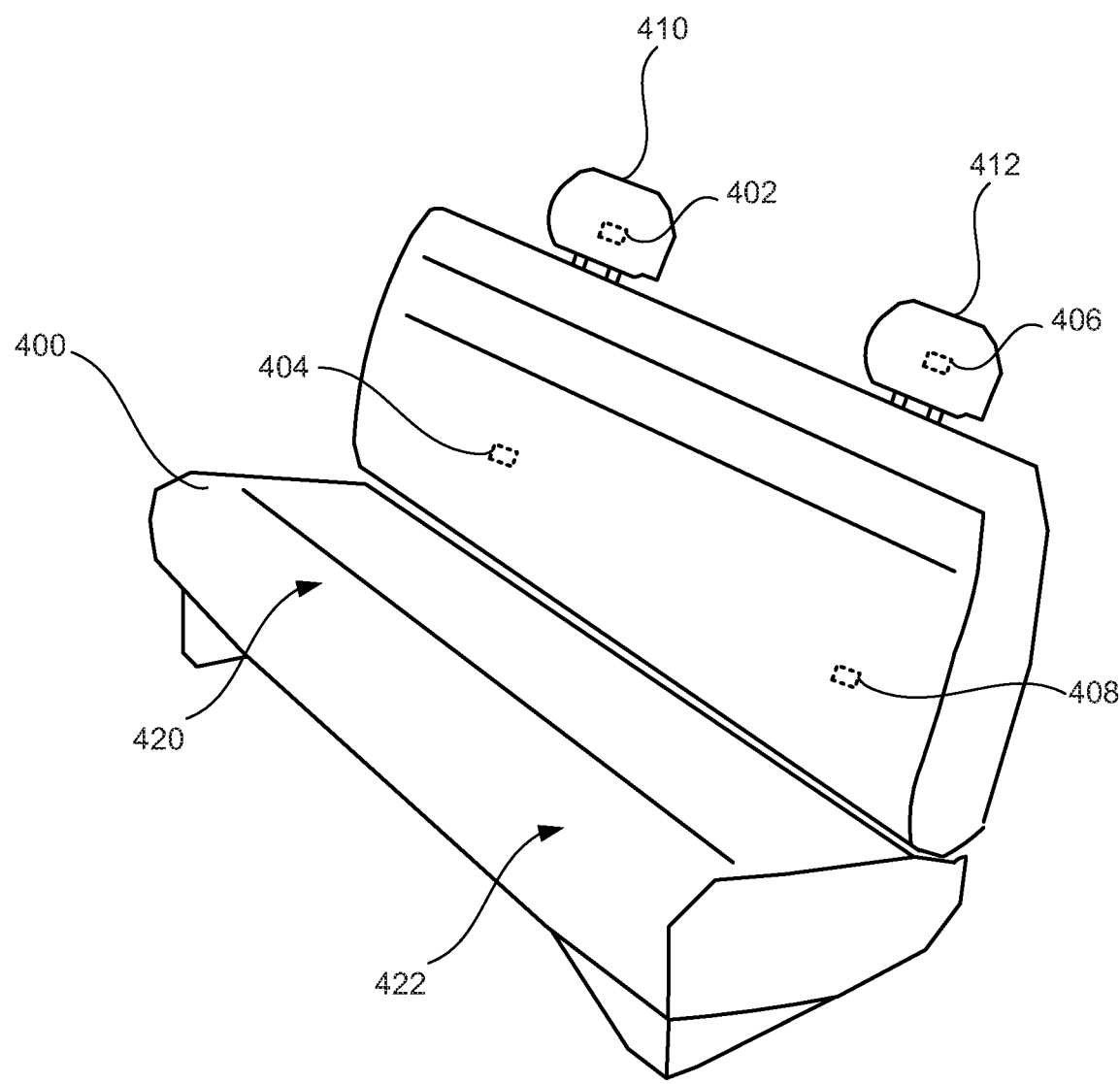
FIG. 4 illustrates an example vehicle bench seat according to embodiments of the present disclosure.

As can be seen in FIG. 1, vehicle 100 may include one or more seats 102A-D. Each seat may have one or more corresponding accelerometers 104A-D coupled thereto. Accelerometers may be positioned on various components of the one or more seats, such as a head rest, back portion, bottom portion, and/or at various locations on each part, such as on a top of the head rest, back of the headrest, and so forth. FIGS. 3 and 4 illustrate example locations of various accelerometers.

Each accelerometer may be configured to capture data corresponding to movement of the accelerometer, such as vibrations, shaking, and other movements of the seat. In practice, the amount of vibration, shake, and/or movement detected or captured by the accelerometer may be affected by the presence of a mass in the seat. For instance, where a person is present in the seat, the movement of the seat may be dampened, which may be reflected in the measurement of one or more accelerometers.

During the manufacturing process of the vehicle 100, one or more tests may be done to determine a minute of arc (MOA) measurement signature corresponding to data from one or more accelerometers of a seat. For instance, one MOA signature may correspond to data from an unoccupied seat, while a second MOA signature corresponds to data from a human-occupied seat, and a third MOA signature corresponds to data from an inanimate-object-occupied seat. A plurality of MOA signatures may be determined under various vehicle conditions and stored in a memory for later use. The conditions may include movement at one or more speeds, different terrains, window settings, seat positions, and more. These MOA signatures may also include or correspond to one or more thresholds that may be used to determine whether a given seat is occupied or not, and whether the seat is occupied by a human or an inanimate object.

In some examples, a restraint control module (RCM) 110 may be configured to determine the MOA measurements. The RCM may receive data from the accelerometers 104A-D, and may determine a MOA measurement corresponding to each accelerometer. This may include using a signal received from one or more accelerometers over time. For instance, a 5 second or 10 second measurement may be taken to determine more accurately the amount of "shake" experienced by the seat. Other time periods may be used as well. The MOA measurement may then be compared to one or more thresholds, prior minute of arc measurements, or more. For example, the MOA measurement may be compared to one or more stored values determined during manufacturing (as described above), to categorize the seat as currently occupied by a human or object, or unoccupied.

In some examples, a single seat may include two or more accelerometers. Data from the two or more accelerometers may be used by the restraint control module to more accurately determine whether the seat is occupied or not. This is discussed in further detail below with respect to FIGS. 3 and 4.

Figure 2:
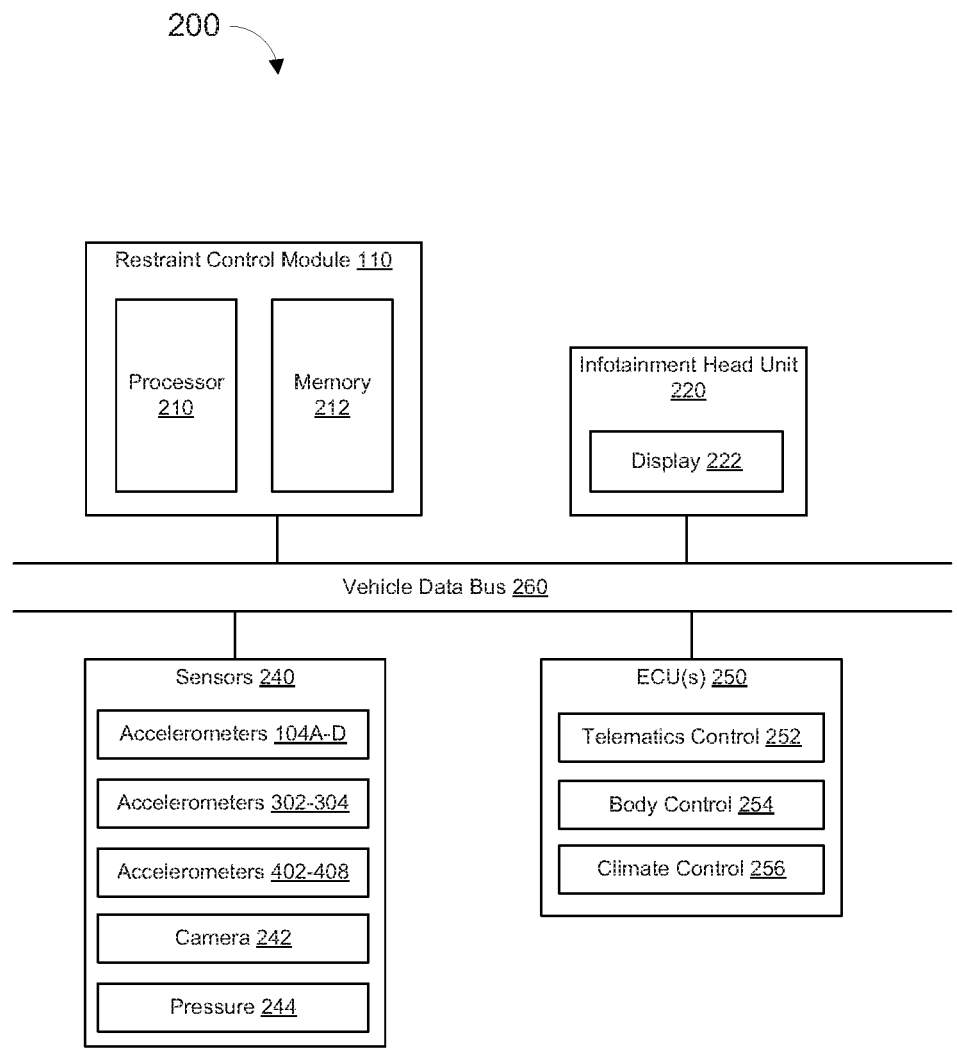
FIG. 2 illustrates an example block diagram of electronic components of the vehicle of FIG. 1.

FIG. 2 illustrates an example block diagram 200 showing electronic components of vehicle 100, according to some embodiments. In the illustrated example, the electronic components 200 include the restraint control module (RCM) 110, infotainment head unit 220, sensors 240, electronic control unit(s) 250, and vehicle data bus 260.

The RCM 110 may include a microcontroller unit, controller or processor 210 and memory 212. Processor 210 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 212 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 212 includes multiple kinds of memory, particularly volatile memory and non-volatile memory.

The memory 212 may be computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 212, the computer readable medium, and/or within the processor 210 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The infotainment head unit 220 may provide an interface between vehicle 100 and a user. The infotainment head unit 220 may include one or more input and/or output devices. The input devices may include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a heads-up display, a center console display (e.g., a liquid crystal display (LCD), an organic light emitting diode (OLED) display, a flat panel display, a solid state display, etc.), and/or speakers. In the illustrated example, the infotainment head unit 220 includes hardware (e.g., a processor or controller, memory, storage, etc.) and software (e.g., an operating system, etc.) for an infotainment system (such as SYNC® and MyFord Touch® by Ford®, Entune® by Toyota®, IntelliLink® by GMC®, etc.). In some examples the infotainment head unit 220 may share a processor with RCM 110. Additionally, the infotainment head unit 220 may display the infotainment system on, for example, a center console display 222 of vehicle 100.

Sensors 240 may be arranged in and around the vehicle 100 in any suitable fashion. In the illustrated example, sensors 240 include accelerometers 104A-D, 302-304, and 402-48. Sensors 240 may also include a camera 242, and one or more pressure sensors 244 corresponding to each seat of the vehicle. Other sensors may be included as well.

The ECUs 250 may monitor and control subsystems of vehicle 100. ECUs 250 may communicate and exchange information via vehicle data bus 260. Additionally, ECUs 250 may communicate properties (such as, status of the ECU 250, sensor readings, control state, error and diagnostic codes, etc.) to and/or receive requests from other ECUs 250. Some vehicles 100 may have seventy or more ECUs 250 located in various locations around the vehicle 100 communicatively coupled by vehicle data bus 260. In some examples, RCM 110 may be one of the many ECUs. ECUs 250 may be discrete sets of electronics that include their own circuit(s) (such as integrated circuits, microprocessors, memory, storage, etc.) and firmware, sensors, actuators, and/or mounting hardware. In the illustrated example, ECUs 250 may include the telematics control unit 252, the body control unit 254, and the climate control unit 256.

The telematics control unit 252 may control tracking of the vehicle 100, for example, using data received by a GPS receiver, communication module 230, and/or one or more sensors. The body control unit 254 may control various subsystems of the vehicle 100. For example, the body control unit 254 may control power a trunk latch, windows, power locks, power moon roof control, an immobilizer system, and/or power mirrors, etc. The climate control unit 256 may control the speed, temperature, and volume of air coming out of one or more vents. The climate control unit 256 may also detect the blower speed (and other signals) and transmit to the on-board computing system 210 via data bus 260. Other ECUs are possible as well.

Vehicle data bus 260 may include one or more data buses that communicatively couple the RCM 110, infotainment head unit 220, sensors 240, ECUs 250, and other devices or systems connected to the vehicle data bus 260. In some examples, vehicle data bus 260 may be implemented in accordance with the controller area network (CAN) bus protocol as defined by International Standards Organization (ISO) 11898-1. Alternatively, in some examples, vehicle data bus 250 may be a Media Oriented Systems Transport (MOST) bus, or a CAN flexible data (CAN-FD) bus (ISO 11898-7).

FIG. 3 illustrates a perspective view of an example vehicle 300 having a seat 301 according to embodiments of the present disclosure.

Embodiments herein may be described with reference to a front vehicle seat, however it should be understood that the same principles apply to other vehicle seats. In some examples, the vehicle seat may be a bucket seat or other single person seat. Further, the seat may be a front "driver's" seat, passenger seat, or a rear seat. Further, the seat may be a bench seat as shown in FIG. 4.

As can be seen in FIG. 2, seat 301 may include a headrest 306, a back portion 308, and a bottom portion 310.

Vehicle 300 may also include one or more accelerometers coupled to the vehicle seat 301, located at various positions or on various parts of the seat 301. For instance, accelerometer 302 is positioned on the headrest 306, while accelerometer 304 is shown positioned on a lower part of the back portion 308 of seat 301. The position of the accelerometer(s) may be selected such that a difference in measurement between an occupied and an unoccupied seat is maximized. As such, the accelerometers may be positioned in a middle of the seat horizontally. It should be noted that the position of accelerometer 302 and 304 may be different than shown in FIG. 1.

An RCM of vehicle 300 may be electrically connected to accelerometers 302 and 304, and may transmit and/or receive data from the accelerometers. The RCM may receive data from accelerometers 302 and 304, and may then determine a minute of arc (MOA) measurement for the vehicle seat 301. The MOA measurement may be specific to a single accelerometer (i.e., either accelerometer 302 or 304), or may be specific to the seat 301 (i.e., incorporating data from both accelerometer 302 and 304 to make a single MOA measurement).

As noted above, determining the MOA measurement may involve analyzing data received from the accelerometer or accelerometers over a period of time, and generating a MOA signature. The MOA signature may then be compared to one or more stored values, MOA signatures, or thresholds.

The RCM may then use the MOA measurement to determine whether seat 301 is occupied or not. For instance, where the MOA measurement is relatively large compared to one or more stored values, MOA signatures, or thresholds, that may be an indication that the seat is unoccupied. A large MOA measurement may be due to an un-dampened shake or vibration of the vehicle seat.

However, where a person occupies the seat, the vibration of seat 301 may be dampened. This may cause the MOA measurement to be smaller. In particular, the presence of a person may dampen movement of headrest 302 and back portion 308 of the seat 301. In some examples, the movement of headrest 302 may be dampened to a greater or lesser extent than the back portion 308.

In response to determining that the seat 301 is occupied, the RCM may provide an alert or warning. The RCM may also receive data from a seat belt sensor to determine whether a seatbelt corresponding to seat 301 is buckled. If the seat is occupied and the seat belt is unbuckled, the RCM may provide the alert or warning to the occupant.

Alternatively, if the RCM determines that the seat is unoccupied based on the MOA measurement, the RCM may disable one or more vehicle seat features. This may include disabling one or more airbags or safety systems particular to the seat 301, while allowing the safety systems corresponding to one or more other seats to remain enabled. Other actions may be taken as well.

In some examples, only one accelerometer may be used to determine a MOA measurement, and to determine the occupancy of the vehicle seat. However, in other examples two or more accelerometers may be used to determine the vehicle occupancy. For example where two accelerometers are used, this may include determining first and second MOA measurements corresponding to the two accelerometers respectively, and using both MOA measurements to determine the seat occupancy. The two accelerometers may be positioned side by side, or may be positioned in different locations on the seat.

In some examples the RCM may determine that the seat 301 is occupied by a person based on both MOA measurements. For instance, the MOA measurements for a seat occupied by a person may have a particular MOA signature, in that the person dampens the movement of both accelerometers 302 and 304. The first and second MOA measurements may thus both have similar MOA signatures.

The RCM may also be configured to determine that the vehicle seat 301 is occupied by an inanimate object (rather than a person) based on the first and second MOA measurements. In an example where a heavy but short object (such as a box) is placed on the seat 301, the back portion near accelerometer 304 may not move as much as the head rest 306. As such, a first MOA measurement corresponding to accelerometer 302 may be greater than a second MOA measurement corresponding to accelerometer 304. The difference in MOA measurements may enable the RCM to determine that an object is present in seat 301, but that it is not a person.

The positioning and number of accelerometers may be extended beyond two, such that there may be more information gathered regarding the height of an object or person occupying the seat. As such, even where a person is too short to reach the headrest, one or more accelerometers may provide data that can be used to determine the seat occupancy with respect to whether the seat is occupied by a person or an inanimate object.

Further, the ideas described herein may be extended to each seat in a vehicle. The vehicle may include a plurality of accelerometers corresponding to a plurality of vehicle seats, wherein the restraint control module is further configured to determine a plurality of minute of arc measurements for the plurality of vehicle seats based on data received from the plurality of accelerometers, determine that one or more of the plurality of vehicle seats is occupied based on the plurality of minute of arc measurements, and provide an alert indicating that one or more of the plurality of vehicle seats is occupied.

FIG. 4 illustrates an example bench seat 400 that may be part of a vehicle such as vehicle 100 and/or 300. Bench seat 400 may include two seat positions 420 and 422, each having a corresponding headrest 410 and 412. Further, bench seat 400 may include one or more accelerometers corresponding to each seat position. As shown in FIG. 4, seat position 420 has corresponding accelerometers 402 and 404, while seat position 422 has corresponding accelerometers 406 and 408.

An RCM coupled to these accelerometers may be able to determine MOA measurements corresponding to each accelerometer or each seat position. And based on these MOA measurements, the RCM may be able to determine whether neither, both, or only one seat position is occupied.

For example, if seat position 420 is occupied and seat position 422 is unoccupied, the MOA measurements corresponding to accelerometers 402 and 404 and/or seat position 420 may be dampened to a greater extent than those corresponding to accelerometers 406 and 408 and/or seat position 422. This difference may be used to determine that only one of the seat positions is occupied.

Figure 5:
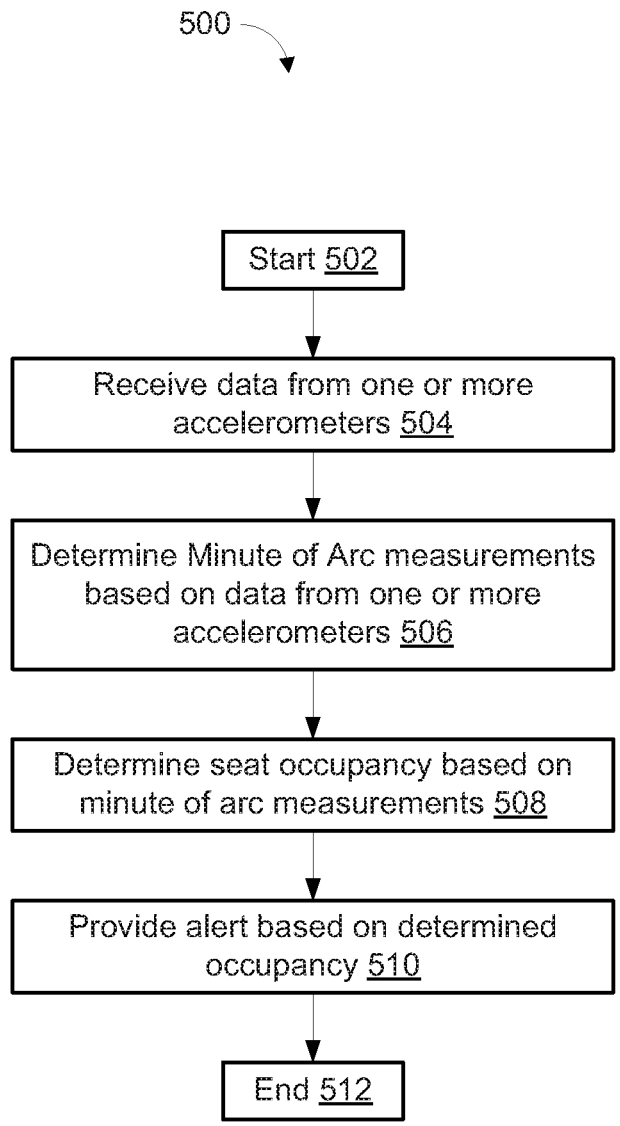
FIG. 5 illustrates a flowchart of an example method according to embodiments of the present disclosure.

FIG. 5 illustrates an example method 500 according to embodiments of the present disclosure. Method 500 may enable an RCM to determine that one or more vehicle seats is occupied, and whether the seat is occupied by a person or an inanimate object. The flowchart of FIG. 5 is representative of machine readable instructions that are stored in memory (such as memory 212) and may include one or more programs which, when executed by a processor (such as processor 210) may cause vehicle 100, 300, and/or one or more systems or devices to carry out one or more functions described herein. While the example program is described with reference to the flowchart illustrated in FIG. 5, many other methods for carrying out the functions described herein may alternatively be used. For example, the order of execution of the blocks may be rearranged or performed in series or parallel with each other, blocks may be changed, eliminated, and/or combined to perform method 500. Further, because method 500 is disclosed in connection with the components of FIGS. 1-4, some functions of those components will not be described in detail below.

Method 500 may begin at block 502. At block 504, method 500 may include receiving data from one or more accelerometers.

At block 506, method 500 may include determining MOA measurements based on the data received from the one or more accelerometers. As noted above, the MOA measurements may correspond to each accelerometer individually, or may correspond to the seat as a whole.

At block 508, method 500 may include determining seat occupancy based on the MOA measurements. This may include determining whether the seat is occupied by a person or an inanimate object, as well as whether the seat is occupied at all.

At block 510, method 500 may include providing an alert based on the determined occupancy. For instance, where the seat belt corresponding the seat is unbuckled but the seat is determined to be occupied by a person, an alert or warning may be provided. However, if the seat is determined to not be occupied, or is determined to be occupied by an inanimate object, one or more vehicle safety features may be disabled.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
   a vehicle seat;
   an accelerometer coupled to the vehicle seat; and
   a restraint control module configured to:
      determine a minute of arc measurement for the vehicle seat based on data received from the accelerometer;
      identify an occupant of the vehicle seat as a human occupant when the minute of arc measurement corresponds to first stored data for a human-occupied seat;
      identify the occupant of the vehicle seat as an inanimate object when the minute of arc measurement corresponds to second stored data for an inanimate-object-occupied seat; and
      provide an alert upon identifying the occupant of the vehicle seat as the human occupant.

2. The vehicle of claim 1, wherein the accelerometer is positioned on a headrest of the vehicle seat.

3. The vehicle of claim 1, wherein the accelerometer is positioned on a back portion of the vehicle seat.

4. The vehicle of claim 1, wherein the accelerometer is a first accelerometer coupled to the vehicle seat at a first position, the vehicle further comprising a second accelerometer coupled to the vehicle seat at a second position different than the first position, wherein the restraint control module is further configured to:
- determine a first minute of arc measurement based on first data received from the first accelerometer;
- determine a second minute of arc measurement based on second data received from the second accelerometer; and
- determine that the vehicle seat is occupied based on both the first and the second minute of arc measurements.

5. The vehicle of claim 4, wherein the restraint control module is further configured to:
- determine that the vehicle seat is occupied by a person based on the first and the second minute of arc measurements; and
- determine that the vehicle seat is occupied by an inanimate object based on the first and the second minute of arc measurements.

6. The vehicle of claim 5, wherein the first accelerometer is coupled to a headrest of the vehicle seat, and the second accelerometer is coupled to back portion of the vehicle seat, and wherein the restraint control module is further configured to determine that the vehicle seat is occupied by the inanimate object by determining that the first minute of arc measurement is greater than the second minute of arc measurement.

7. The vehicle of claim 1, wherein the vehicle seat is a bench seat having two or more seat positions, and wherein the accelerometer is a first accelerometer coupled to a first side of the bench seat, the vehicle further comprising a second accelerometer coupled to a second side of the bench seat, wherein the restraint control module is further configured to:
- determine a first minute of arc measurement based on first data received from the first accelerometer;
- determine a second minute of arc measurement based on second data received from the second accelerometer; and
- based on the first and the second minute of arc measurements, determine that one or more of the seat positions of the bench seat is occupied.

8. The vehicle of claim 1, wherein the restraint control module is further configured to:
- determine that the vehicle seat is unoccupied or that the occupant is the inanimate object based on the minute of arc measurement; and
- responsively disable one or more vehicle seat features.

9. The vehicle of claim 1, wherein the vehicle further comprises:
- a plurality of accelerometers corresponding to a plurality of vehicle seats, wherein the restraint control module is further configured to:
  - determine a plurality of minute of arc measurements for the plurality of vehicle seats based on data received from the plurality of accelerometers;
  - determine that one or more of the plurality of vehicle seats is occupied based on the plurality of minute of arc measurements; and
  - provide the alert indicating that one or more of the plurality of vehicle seats is occupied.

10. The vehicle of claim 1, wherein the restraint control module is further configured to disable one or more vehicle safety features upon identifying that the seat is unoccupied or the occupant is the inanimate object.

11. A method for detecting vehicle seat occupancy comprising:
- determining, by a vehicle restraint control module, a minute of arc measurement based on data received from an accelerometer coupled to a vehicle seat;
- identifying an occupant of the vehicle seat as a human occupant when the minute of arc measurement corresponds to first stored data for a human-occupied seat;
- identifying the occupant of the vehicle seat as an inanimate object when the minute of arc measurement corresponds to second stored data for an inanimate-object-occupied seat; and
- providing an alert upon identifying the occupant of the vehicle seat as the human occupant.

12. The method of claim 11, wherein the accelerometer is positioned on a headrest of the vehicle seat.

13. The method of claim 11, wherein the accelerometer is positioned on a back portion of the vehicle seat.

14. The method of claim 11, wherein the accelerometer is a first accelerometer coupled to the vehicle seat at a first position, the method further comprising:
- determining a first minute of arc measurement based on first data received from the first accelerometer;
- determining a second minute of arc measurement based on second data received from a second accelerometer coupled to the vehicle seat at a second position different than the first position; and
- determining that the vehicle seat is occupied based on both the first and the second minute of arc measurements.

15. The method of claim 14, further comprising:
- determining that the vehicle seat is occupied by a person based on the first and the second minute of arc measurements.

16. The method of claim 14, further comprising:
- determining that the vehicle seat is occupied by an inanimate object based on the first and the second minute of arc measurements.

17. The method of claim 16, wherein the first accelerometer is coupled to a headrest of the vehicle seat, and the second accelerometer is coupled to back portion of the vehicle seat, and wherein the method further comprises determining that the vehicle seat is occupied by the inanimate object by determining that the first minute of arc measurement is greater than the second minute of arc measurement.

18. The method of claim 11, wherein the vehicle seat is a bench seat having two or more seat positions, and wherein the accelerometer is a first accelerometer coupled to a first side of the bench seat, the method further comprising:
- determining a first minute of arc measurement based on first data received from the first accelerometer;
- determining a second minute of arc measurement based on second data received from a second accelerometer coupled to a second side of the bench seat; and
- based on the first and the second minute of arc measurements, determining that one or more of the seat positions of the bench seat is occupied.

19. The method of claim 11, further comprising:
- determining that the vehicle seat is unoccupied or that the occupant is the inanimate object based on the minute of arc measurement; and
- responsively disabling one or more vehicle seat features.

20. The method of claim 11, further comprising:
- determining a plurality of minute of arc measurements for a plurality of vehicle seats based on data received from a plurality of accelerometers, each corresponding to one of the plurality of vehicle seats;
- determining that one or more of the plurality of vehicle seats is occupied based on the plurality of minute of arc measurements; and
- providing the alert indicating that one or more of the plurality of vehicle seats is occupied.

* * * * *